July 24, 1962
H. F. MARTIN
3,045,381
FISHING FLOAT OR LURE
Filed May 12, 1960
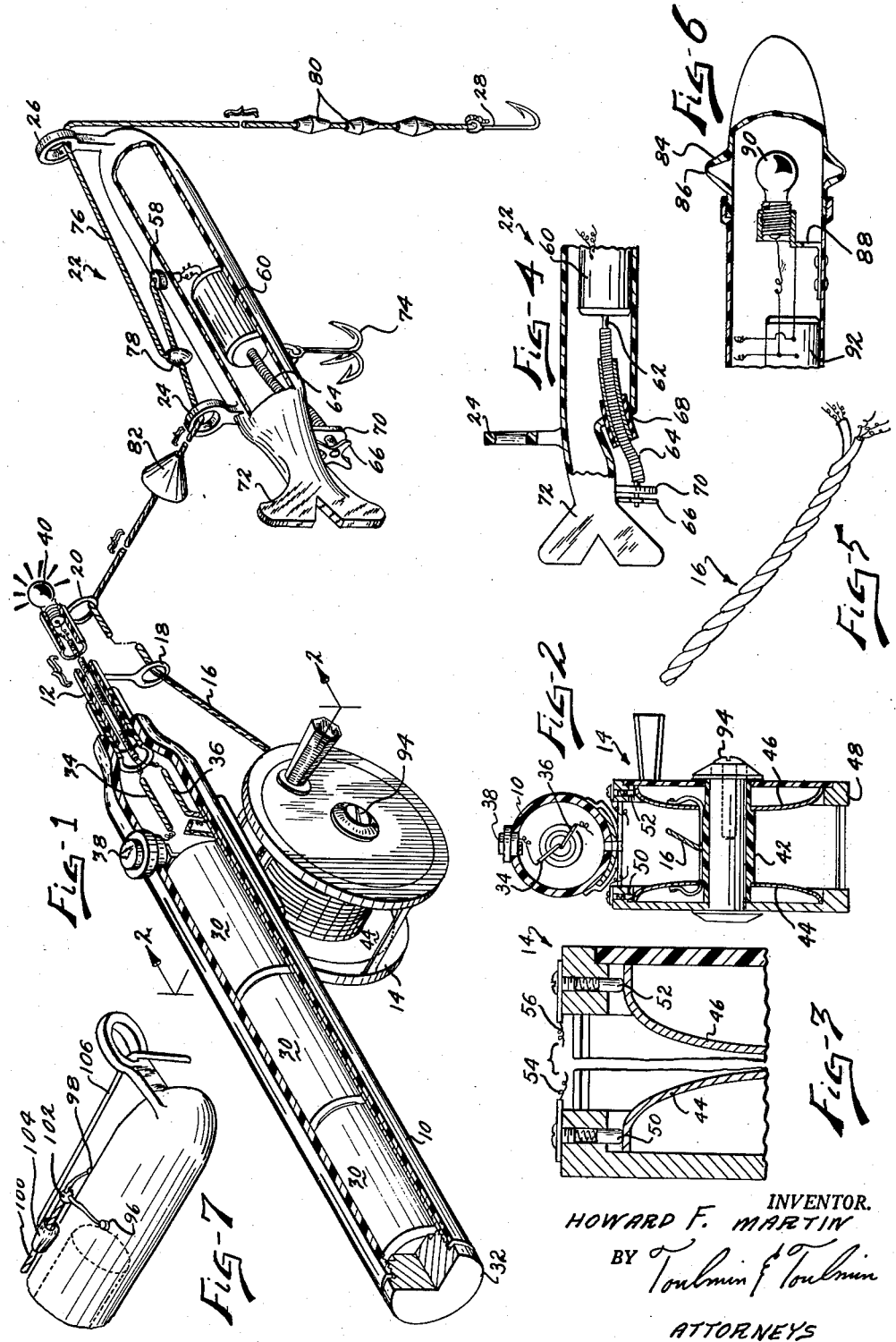
INVENTOR.
HOWARD F. MARTIN
BY
ATTORNEYS

United States Patent Office 3,045,381
Patented July 24, 1962

3,045,381
FISHING FLOAT OR LURE
Howard F. Martin, 5791 W. 3rd St., Dayton, Ohio, assignor of one-fourth to Robert G. Gump and one-fourth to Richard E. Gump, both of Trotwood, Ohio
Filed May 12, 1960, Ser. No. 28,629
8 Claims. (Cl. 43—26.2)

This invention relates to novel fishing equipment, particularly to a novel lure and a combination thereof with a novel fishing line and reel and a special fishing pole. More particularly the present invention relates to a motorized fishing lure which can be controlled from the pole end of the line to cause the lure to move about or advance to a predetermined region and to come to a halt when desired.

Many times in the act of fishing it is not possible to cast a lure to the exact spot desired and in other cases it may be desired to fish by trolling when no means are available for moving the lure about on or in the water.

With the foregoing in mind, it becomes a primary object of the present invention to provide a novel fishing lure which is provided with a motor so that it can be driven about in the water to get the lure to any desired point or to return the lure therefrom or to move the lure about in the water for trolling purposes.

Another object of this invention is the provision of a motorized lure and a special fishing line connected therewith by means of which the motor in the lure can be energized.

A still further object of this invention is the provision of the special fishing pole adapted for use with a motorized lure according to this invention having means for receiving batteries and having a control switch for controlling the movement of the lure.

A still further object of this invention is the provision of a special reel structure adapted for use with a conducting fishing line of the nature utilized with a lure of the present invention.

Still another object of this invention is the provision of an arrangement whereby the fishing pole or the lure, or both, could be provided with illuminating means for night fishing or, in the case of the lure, for indicating the position of the lure in the water.

It is also an object of this invention to embody the principles of the present invention in a relatively simple inexpensive structure.

Still a further object of this invention is the provision of a fishing apparatus of the nature referred to which is relatively simple in structure and is therefore simple to manufacture and easy to service and relatively low in cost.

These and other objects and advantages of the present invention will become more apparent upon reference to the following specification taken in connection with the accompanying drawings in which:

FIGURE 1 is a perspective view partly broken away of a fishing pole and reel and lure according to the present invention;

FIGURE 2 is a vertical transverse sectional view indicated by line 2—2 on FIGURE 1 showing the reel and the handle of the fishing pole in cross section;

FIGURE 3 is a fragmentary enlarged view taken through a portion of the reel showing the manner in which electrical connection is made with the end bells of the reel while not interfering with the rotation of the reel;

FIGURE 4 is a fragmentary sectional view taken through the rear end of the fishing lure of FIGURE 1 showing the motor therein and the manner in which it is connected with a drive propeller;

FIGURE 5 is a perspective view showing the twisted wire couple that makes up the fishing line according to this invention;

FIGURE 6 is a fragmentary sectional view through the front end of a modified form of the lure showing how an illuminating means could be mounted therein; and FIGURE 7 is a fragmentary view of a somewhat modified arrangement wherein the wire couple has two points of connection to the lure.

Referring to the drawings somewhat more in detail FIGURE 1 shows a fishing pole having a handle portion 10 and a rod portion 12 projecting therefrom. Attached to one side of the handle of the pole in a conventional manner is a reel structure 14. Leading from the reel structure is a fishing line 16 that passes through the eyes 18 and 20 on the rod and then to a lure according to this invention which is generally indicated at 22. The line extends through eyes 24 and 26 provided on a lure and then leads on to a hook 28.

The pole handle 10 is hollow and is adapted for receiving therein the batteries 30. A removable cap 32 permits access to the inside of the handle for inserting and removing the batteries.

These batteries are connected in circuit by any conventional means with the wires 34 and 36 leading toward the rod 12. The wire 34 has interposed therein a normally open push button switch 38 which can be closed to complete the circuit through wire 34.

Wires 34 and 36 lead through the rod 12 to a light bulb 40 mounted on a outer end of the rod. As will be seen hereinafter, closing switch 38 will cause illumination of bulb 40.

As will be seen FIGURES 2 and 3 the reel generally indicated at 14 comprises a spool having a hub 42 of insulating material with metal end bell portions 44 and 46. The entire spool is mounted in a frame 48 also of electrical insulating material. In the frame 48 adjacent the periphery of each of the end bells 44 and 46 are the brushes 50 and 52 respectively. These brushes are connected by the wires 54 and 56 respectively with the opposite sides of the electrical circuit that includes the batteries 30 and the switch 38.

The said end bells 44 and 46 are also connected to the individual wires of a twisted wire couple making up the aforementioned fishing line 16. By this arrangement, closing of switch 38 will apply the voltage of the batteries 30 to the two wires of the twisted wire couple making up the fishing line 16.

As has been seen before line 16 leads to lure 22 and is connected thereto as by the grommet 58 through which the wires lead to an electric motor 60. Electric motor 60 has an output shaft 62 which may connect with a sheathed flexible drive element 64 that leads to the outside of the lure and is connected with a drive propeller 66. The lure is formed of a hollow body of plastic or the like and the aforementioned flexible drive leads from the motor inside the lure to the outside to be connected with propeller 66 by way of the sealing sleeve 68. The lure may be provided with a support bearing means 70 externally of the lure adjacent the propeller. The lure is preferably provided with fins forming rudder means as at 72 in order to cause the lure to follow a more or less straight path when the motor 60 is energized and the propeller 66 rotates.

The lure may also be provided with other hooks than hook 28 as in the form of the gang hook 74 suspended from beneath the lure.

The connection of line 16 with hook 28 is by way of an auxiliary leader 76 connected at one end with hook 28 and at its other end attached to a running eye 78 that is slidable on fishing line 16 and which is also of such a size that it will readily pass through eye 26 at the forward end of the lure.

By this arrangement, when the lure comes to a halt, the weight 80 provided on the leader will cause the hook 26 to descend and the weights will also pull the eyelet member 78 through the eye 26 at the front end of the lure. The line is provided with a movable stop member 82 mounted on the portion of the line leading from the pole to the lure and this member of such a size that it will stop against the eye 24 at the back of the lure and thus limit the depth to which the hook 28 can sink. This last member, as mentioned, is adjustable so that the fishing depth can thus be determined readily in this manner.

It will be evident, that when the lure is placed in the water, closing of switch 38 will cause the motor 60 to run and to drive the lure in the water. The direction which the lure takes can be regulated, at least to a degree, by manipulation of the line through lateral movement of the pole. In this manner the lure can be caused to move in substantially any direction and, by suitable manipulation, can be caused to move back and forth in the water thus effecting a trolling operation when so desired. At other times, when the lure is halted and the hook is permitted to sink to any desired level in the water, the lure will act as a bobber because it is hollow and buoyant and will float upon the top of the water. To this end, the lure may be of some bright color such as red or white or a combination thereof so that it can readily be seen in the water.

FIGURE 6 shows a modified arrangement wherein the nose portion of the lure at 84 is of a transparent or translucent material and which nose portion may be formed with outwardly extending projections 86. Mounted within the lure on a bracket 88 is a light bulb 90 that is connected in parallel with the drive motor 92 so that whenever the motor is energized the light bulb 90 will also be energized. Because of the translucent or transparent nose portion with the projections 86, the lure will be easily visible in the water in the dark and thus its position and movements can readily be determined from wherever the fisherman is positioned whether it be on the bank or in a boat.

It is understood that light 90 can be separately energized by providing a still further wire in the fishing line but it is believed that ordinarily it will be sufficient to illuminate this element simultaneously with the motor.

In the reel arrangement shown, the entire spool is removable from the reel by availing of the screw 94 but it will be understood that the present invention can readily be practiced in connection with conventional reels so long as the end bells of the spool are electrically isolated from each other thereby permitting the two wires of the fishing line to be individually connected with the two end bells and electrical connection effected with the two end bells from opposite sides of batteries in the handle of the pole, or an external battery.

It will be understood that modifications of this nature are intended to be encompassed within the purview of the present invention.

The modification of FIGURE 7 shows another manner in which the fishing line could be connected with the lure. In this modification the individual wires of the fishing lines are separated at the lure and enter the lure at the separate points 96 and 98. The two wires are brought together and joined in the fishing line 100 and at their point of joining there is an eyelet 102 fixedly attached to the line. Because of this arrangement the slidable eyelet 104 that is connected with the leader 106 leading to the hook can readily move without interference when the lure stops and the hook sinks in the water. It will be understood that in connection with both modifications, when the lure is first launched or is in motion, the tension on the fishing line will be sufficient to support the hook in its elevated position and then it will not sink downwardly in the water until the lure is brought to a halt.

It will be understood that this invention is susceptible to modification in order to adapt it to different usages and conditions; and, accordingly, it is desired to comprehend such modifications within this invention as may fall within the scope of the appended claims.

I claim:

1. In combination; a fishing lure, an electric motor in the lure, a propeller connected to said lure and being driven by the motor thereby driving the lure in water, and a fine flexible twisted wire couple forming a fishing line leading from the lure and connected to said motor to supply energy thereto, there being a source of electrical energy and switch means connected to said line at the end opposite the lure, a first eye means on the lure adjacent one end thereof through which the line passes to the motor, a second eye means on the lure adjacent the other end thereof, a running eye on the line, and a leader conected to said running eye and passing through said second eye means for connection with a hook means.

2. In combination; a buoyant fishing lure having an electric motor driven propeller, a wire couple forming a fishing line leading to the lure and connected to the motor to supply energy thereto, eye means on the lure, a running eye on the line, and a leader leading from the running eye through the said eye means on the lure and being adapted at its end opposite the running eye for connection with a hook means.

3. In combination; a buoyant fishing lure having an electric motor driven propeller, a wire couple forming a fishing line leading to the lure and connected to the motor to supply energy thereto, eye means on the lure, a running eye on the line, and a leader leading from the running eye through the said eye means on the lure and being adapted at its end opposite the running eye for connection with a hook means, there being a stop member on the wire couple to engage said eye means to limit the sinking of a hook connected to said leader.

4. The combination according to claim 2 which includes guide fins on said body.

5. The combination according to claim 2 in which, at least the nose part of the lure is capable of transmitting light, and a light bulb is mounted in the lure in the region of said nose part.

6. The combination according to claim 2 in which, at least the nose part of the lure is capable of transmitting light, and a light bulb is mounted in the lure in the region of said nose part, said bulb being connected in parallel with said motor.

7. The combination according to claim 2 in which, at least the nose part of the lure is capable of transmitting light, and a light bulb is mounted in the lure in the region of said nose part, said nose part being detachable from the body to permit access to said bulb.

8. The combination according to claim 2 in which said eye means is larger than said running eye to permit the running eye to pass through said eye means.

References Cited in the file of this patent

UNITED STATES PATENTS

| | | |
|---|---|---|
| 1,190,872 | Dildine | July 11, 1916 |
| 1,906,791 | Grossmann | May 2, 1933 |
| 2,227,420 | Augenblick | Jan. 7, 1941 |
| 2,498,609 | Reil | Feb. 21, 1950 |
| 2,507,541 | Patterson | May 16, 1950 |
| 2,655,757 | Boyce | Oct. 20, 1953 |
| 2,804,712 | Jackson | Sept. 3, 1957 |
| 2,817,920 | Mitchell et al. | Dec. 31, 1957 |

FOREIGN PATENTS

| | | |
|---|---|---|
| 268 | Great Britain | Jan. 5, 1897 |